Oct. 23, 1962  W. A. POWELL ET AL  3,059,906
CABLE GUIDE PULLEYS
Filed Feb. 23, 1961
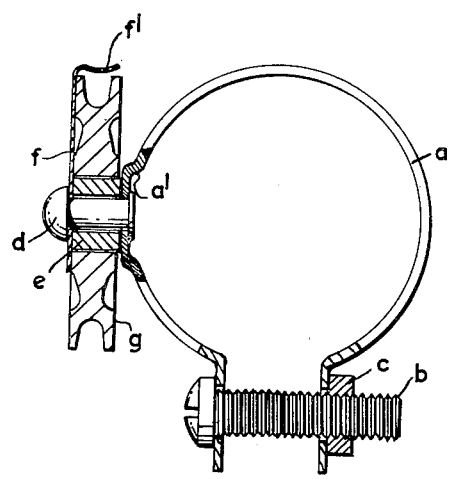
INVENTORS
William A. Powell & Gordon H. Preece
BY
Bierman & Bierman
Attorneys

3,059,906
CABLE GUIDE PULLEYS
William Arthur Powell, 50 Trentham Gardens, Weston
Blvd., and Gordon Herbert Preece, 46 Hazel Grove,
Mapperly Plains, both of Nottingham, England
Filed Feb. 23, 1961, Ser. No. 91,014
Claims priority, application Great Britain Feb. 27, 1960
3 Claims. (Cl. 254—190)

This invention relates to cable guide pulley units for the gear-change of a bicycle of the kind embodying a clip for attachment to a tubular part of the bicycle frame. Fundamentally, such guide pulley units consist of a bearing for the pulley in the form of a boss or hub fixed to the clip, a grooved pulley rotatably mounted thereon, a cable-retaining guard extending over the grooved periphery of the pulley and means for attaching such guard to the boss.

Hitherto, it has been the practice to make the cable-retaining guard detachable so that the cable may be fitted thereto laterally instead of having to be threaded by its end between the pulley and the guard, which in many cases is not possible where a nipple has been permanently attached to such end.

The object of the invention is an improved construction of cable guide pulley unit which obviates the disadvantages of having a detachable part whilst providing the obvious advantage of possible lateral fitting aforesaid of the cable.

According to the invention, a cable guide pulley unit for a bicycle gear-change cable comprising a clip for attachment to a tubular part of the bicycle frame, a pulley boss attached to the clip, a grooved pulley rotatably mounted on the boss, a cable-retaining guard extending over the grooved periphery of the pulley and means for attaching the guard to the boss is characterised in that the said guard is constructed as a spring adapted to be deflected to admit the cable laterally into the pulley groove and in that the pulley boss, the cable guard and the clip are permanently fixed together with a free running pulley on the boss, the whole forming a unit assembly.

The accompanying drawing is a sectional view of one example of a guide pulley unit for a bicycle gear change cable as made in accordance with the present invention.

As shown in the drawing, the unit comprises a spring clip $a$ adapted to be secured to a tube of the bicycle frame (not shown) by a clamping screw $b$ and nut $c$. One part of the clip is bent or cranked at $a'$ in bridge-like shape to accommodate the end of a rivet $d$ clear of the tube, which rivet serves to secure a bush $e$ and a retaining guard $f$ rigidly to such part of the clip. The part $a'$ serves as an inner retaining wall for the pulley on its bush, and as a base for the bush which latter is made slightly longer than the thickness of the pulley so that the pulley is free-running on the bush when the rivet is tightened to secure together the clip, bush and retaining guard as a unit assembly. Because the rivet end is held clear of the tubular frame the clip will sit firmly on the tube without risk of rocking or swivelling. The operative end $f'$ of the guard is curved (as shown) slightly away from the back flange of a peripherally grooved pulley $g$ which is rotatably mounted on the bush and is located axially by contact with the leg of the guard $f$ and the bridge-like part $a'$. The guard is about the same width as the pulley and is made of spring steel so that the usual plastic-coated gear-operating cable can be snapped into position in the groove by lateral pressure when located between the extreme end of the guard and the back flange of the pulley.

By virtue of making the guard of spring steel, so that it can be sprung back to enable the cable to be snapped in sideways into the pulley groove, the parts may be secured together as a single unit assembly by a rivet instead of in separable parts secured by the usual screw for enabling the hitherto rigid guard to be removed or tilted back to admit the cable. The parts are simplified in construction, assembly is easier and quicker and there is no risk of parts such as the screw and guard becoming detached and separated from the other parts whilst in stock, or during fitting.

We claim:

1. A cable guide for a bicycle change-speed mechanism adapted to be mounted on a tubular bicycle frame comprising an annular clip with means for clamping said clip around said frame, an externally extending boss on said clip, a post extending outwardly from said boss, a grooved pulley mounted for rotation on said post, a guard on the outer face of said pulley and held on said post, said guard extending radially to the periphery of said pulley and having an angular guard-end overlying said groove, said guard-end being a spring to permit deflection thereof about the base of said guard to admit a cable into said groove laterally.

2. A cable guide according to claim 1 characterized in that said boss is an offset of said annulus and the inner end of said post is clear of said frame.

3. A cable guide according to claim 1 characterized in that said pulley is mounted on a bush which is mounted on said post, the width of said bush being greater than the width of said pulley.

References Cited in the file of this patent
UNITED STATES PATENTS

| | | |
|---|---|---|
| 301,923 | Reisdorff | July 15, 1884 |
| 1,591,224 | Maurer et al. | July 6, 1926 |
| 1,904,578 | Vanderhoof | Apr. 18, 1933 |
| 2,773,398 | Swain | Dec. 11, 1956 |